Oct. 14, 1941. W. J. MILLER 2,258,658
APPARATUS FOR MAKING POTTERY WARE
Filed July 15, 1938 4 Sheets-Sheet 1
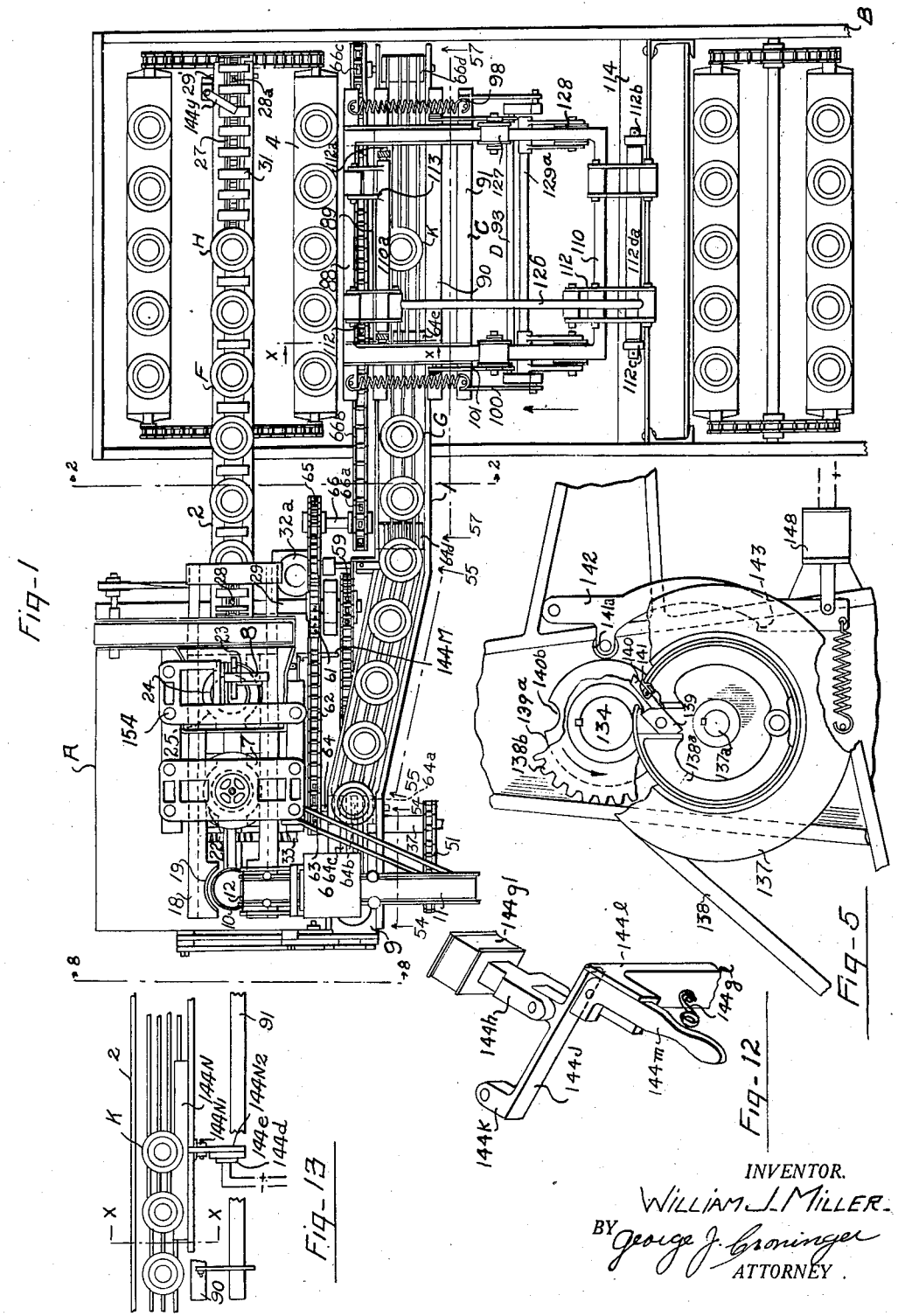
INVENTOR.
WILLIAM J. MILLER
BY George J. Croninger
ATTORNEY.

Oct. 14, 1941.　　W. J. MILLER　　2,258,658
APPARATUS FOR MAKING POTTERY WARE
Filed July 15, 1938　　4 Sheets-Sheet 2
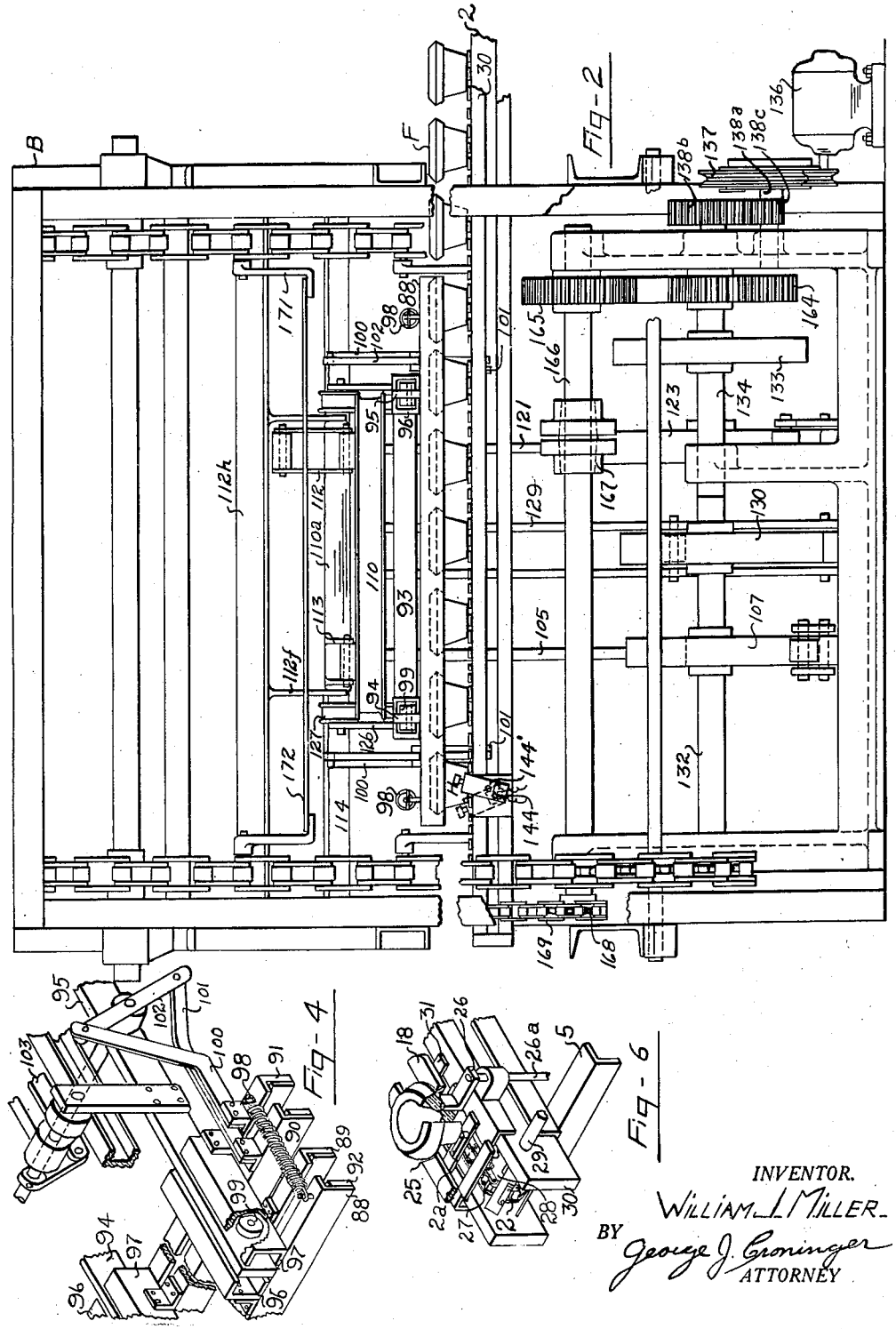
INVENTOR.
WILLIAM J. MILLER
BY George J. Groninger
ATTORNEY

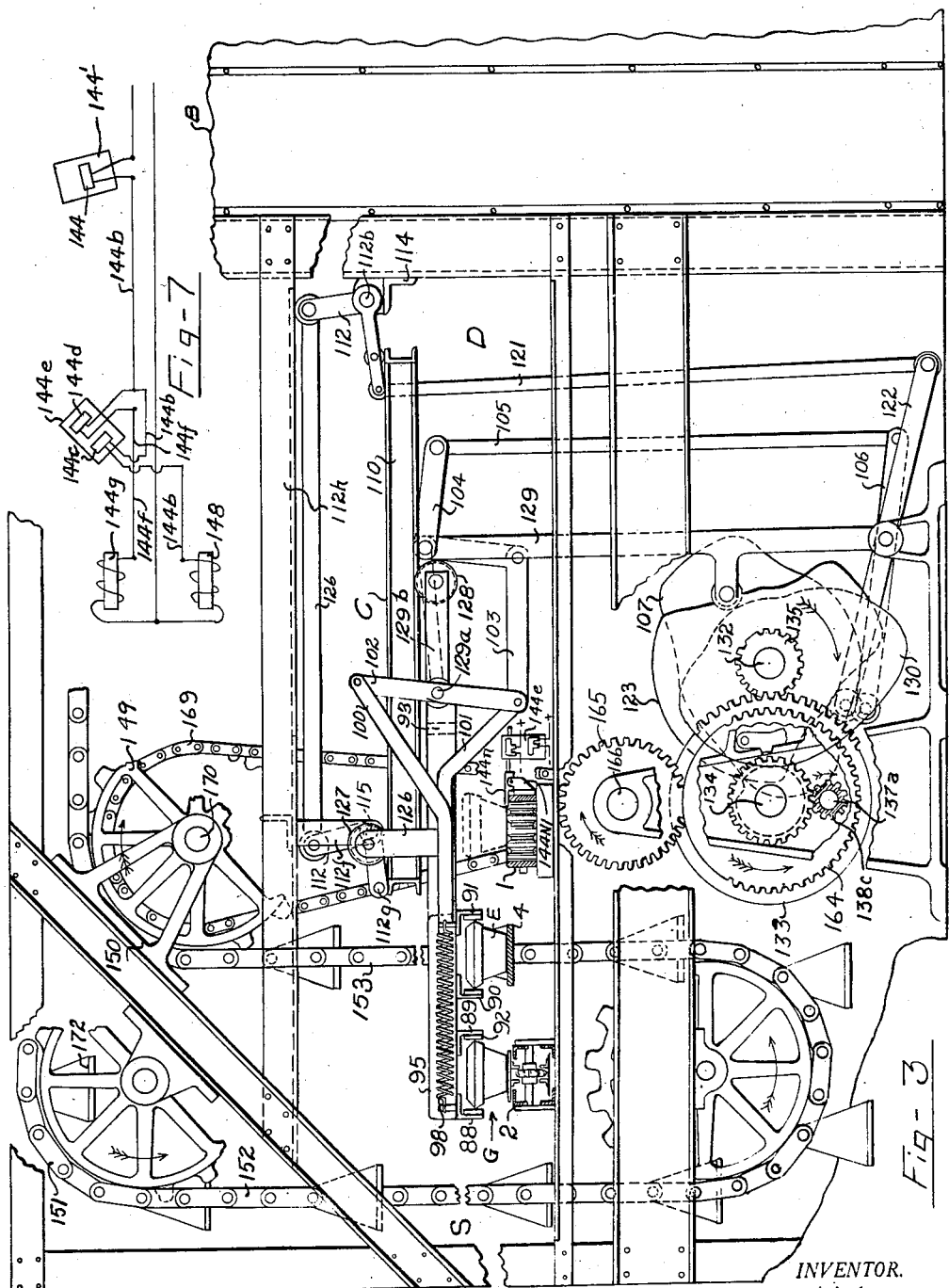

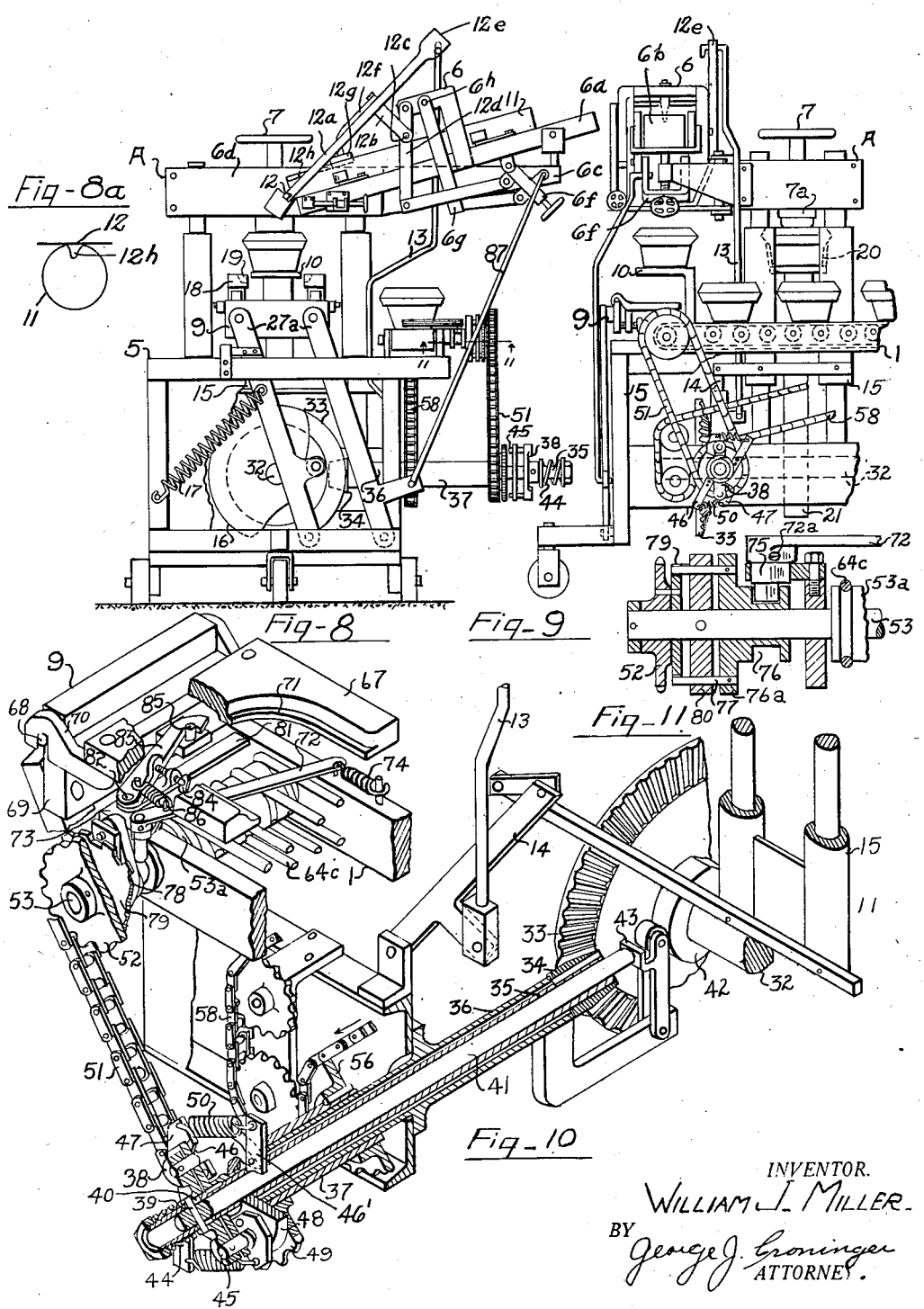

Patented Oct. 14, 1941

2,258,658

UNITED STATES PATENT OFFICE 2,258,658

APPARATUS FOR MAKING POTTERY WARE

William J. Miller, Swissvale, Pa.

Application July 15, 1938, Serial No. 219,385

16 Claims. (Cl. 25—22)

This invention relates to methods and apparatus for making pottery ware, more particularly jiggered potteryware in hollow ware and flatware shapes such as for instance plates, cups, saucers, etc., from plastic clay in or on absorbent plaster molds. The invention has to do with the transferring of molds between the jigger and dryer.

The present invention refers to that phase of pottery manufacture involving the jiggering and drying of jiggered potteryware, a cycle which encompasses the fabrication of the ware in or on plaster molds and the transportation of the molds to a dryer wherein the molds and ware are exposed to a drying atmosphere for an interval after which the ware is stripped from the molds preliminary to finishing operations and the molds are returned to the jigger for refilling.

Heretofore, it has been customary to carry the molds by hand between the jigger and store room both in the case of where the ware was fabricated on a hand jigger and with certain types of automatic jiggering machinery, for instance, that shown in my British Patent 471,589 wherein the fabricating operations are performed mechanically but the step of transporting empty and filled molds between the machine conveyors and dryer is done manually.

The present invention seeks to overcome certain limitations imposed by human speed and endurance in respect of mold transferring to thereby obtain greater continuity of operation in the production cycle and the establishment and maintenance of increased production speeds.

The invention is particularly applicable to use in connection with automatic forming machines of the type wherein the operations or movements of the various elements of the machine are in synchronized succession such as for instance that disclosed in my British patent mentioned supra together with a chain dryer, viz: a dryer having a power driven conveyor with spaced mold supporting shelves transversely arranged between parallel chains.

With the present invention which includes a mold transferring apparatus synchronized with the operation of the chain dryer and the ware fabricating machine, a plurality of empty and filled molds are simultaneously transferred from the filled mold conveyor of the machine to the dryer and from the dryer to the empty mold conveyor of the machine respectively after which the filled molds are travelled through the dryer and the empty molds through the fabricating machine, the transferring operation being repeated in respect of each dryer shelf.

The mechanism for transferring the molds comprises generally duplicate sets of spaced parallel bars together with operating and dryer synchronizing mechanism that is disposed in a bay of the dryer adjacent to the mold conveyors of the machine and a vertical chain course of the dryer with the machine conveyors straddling the same. From a position non-interfering with the chain whilst it is being travelled, the mold transfer is actuated upon the halting of such chain (which occurs in timed relation with the operation of the fabricating machine) to go between the vertical chains and a pair of vertically spaced dryer shelves and to perform the operations of picking up and transferring molds as aforesaid without interrupting the operation of the fabricating machine which is independently powered. All of the molds thus transferred are picked up and transported in spaced relation so as to avoid contact between brims and bases and furthermore, are supported incident to transference between resilient surfaces, for instance rubber, to avoid damage thereto.

The objects therefore of this invention are to eliminate the need for manual intervention in the mold transferring phase of the manufacture of dried, jiggered potteryware, to provide for regularity in the supply of molds to production equipment and the filling of the dryer with molds, to provide for the transference of empty and filled molds simultaneously between a dryer and production equipment, to provide for positive and reliable picking up of a plurality of molds of a set, regardless of fractional differences in dimensions or surface contour, to provide a mold transfer adjustable to accommodate various sets of molds for making different classes of ware, for instance, hollow ware molds or flatware molds which have different dimensional characteristics in respect of diameter, height and contour, to reduce mold depreciation by the elimination of rough handling and collisions, to provide means for safeguarding the apparatus against derangement in whole or in part in the event of improper spotting, supply or travel of the molds, to provide a simplified apparatus requiring a minimum of space and lastly to combine in a single unitary installation, a jigger, mold transfer and dryer.

In the drawings—

Fig. 1 is a top plan view of a complete installation showing the jigger, dryer and mold transferring apparatus, the top covering of the dryer being removed for the purpose of illustrating the bay and transfer apparatus and machine mold conveyors located therein.

Fig. 2 is an end elevation of the dryer looking in the direction of the arrows 2—2 of Fig. 1.

Fig. 3 is a side elevation of the dryer in the zone of the bay in which the mold transferring apparatus and operating mechanism therefor is shown in side elevation and the jigger machine mold conveyors in section.

Fig. 4 is a fragmentary detail in perspective of the parallel mold gripping transfer bars and a portion of the operating mechanism therefor.

Fig. 5 is a detail of the mold transfer timing mechanism.

Fig. 6 is a fragmentary detail in perspective of the output mold conveyor showing a mold disposed thereon in adjacency to a mold lifting mechanism.

Fig. 7 is a wiring diagram of the electrical control system.

Fig. 8 is an end elevation of the jiggering machine taken in the direction of arrows 8—8, Fig. 1.

Fig. 8a is an end view of the slug of clay showing the anti-resealing groove.

Fig. 9 is a side elevation of the feeder end of the jiggering machine of Fig. 8 showing the drive arrangements for the machine mold conveyors.

Fig. 10 is a detail in perspective of the driving means for the machine mold conveyors with certain of the parts broken away and others illustrated in section.

Fig. 11 is a vertical section taken on the line 11—11 of Fig. 8.

Fig. 12 is a detail in perspective of the jigger machine control.

Fig. 13 is a fragmentary top plan view of a circuit breaker utilized as a safety in connection with the operation of the mold conveyors.

With reference to Fig. 1, the installation shown therein comprises generally an automatic potteryware jiggering machine A provided with elongated input or empty mold conveyor 1 and output or filled mold conveyor 2 which straddle a chain course 153, Fig. 3, of the dryer B. The mold transferring apparatus C is arranged in a bay D of the dryer B in operative adjacency to the mold conveyors 1 and 2, the operation generally being that the filled molds F on conveyor 2 and the empty molds E on shelf 4, Fig. 3, of the dryer conveyor are transferred simultaneously, the empty molds to the conveyor 1 and the filled molds to the shelf 4. The empty molds disposed on the conveyor 1 are intermittently fed into and through the fabricating machine A and returned on the output conveyor 2 to a position where they are returned to the dryer shelf by the transfer apparatus.

The machine described in my British Patent #471,589 and shown diagrammatically in Figs. 1, 8 and 9 comprises a frame 5 adapted to support the feeder 6, press 7 and jigger 8 arranged in the order given, the mechanisms being supported on or from suitable machine parts. The frame 5 also supports one end of the empty mold conveyor 1 (which extends along one side thereof and into the dryer bay) and actuating mechanism therefore as well as one end of the output mold conveyor 2. A single seat mold transfer 9 actuated by cam 16 and spring 17, Figs. 8 and 10, operates between the lead end of the mold conveyor 1, and the feeder chuck 10 for the purpose of transporting molds one at a time to a position where the feeder chuck 10 may elevate and lift the molds by their bases into operative adjacency to the feeder incident to the segregation of a charge of clay from the billet 11 by the cutter 12 which is actuated by rod 13 connected to linkage 14, Fig. 10, attached to the press crosshead 15. The transfer 9 is returned to mold receiving position at the lead end of the conveyor 1 whilst the feeder chuck is elevated and the multiple seat mold transfer 18 actuated by suitable cam (not shown) moves to the left, Fig. 1, to position the endmost mold seat 19 below the chuck 10 so that upon lowering thereof (subsequent to the charging of the mold) the mold will be suspended by said seat.

The charged mold is transferred upon reversal of reciprocation of the transfer 18 to a position below the die 7a, Fig. 9, of press 7 where it is engaged and elevated by the press chuck 20 mounted on crosshead 15 which is elevated by a cam 21. The die 7a applies the clay charge to the mold by spreading it over the molding surface and bonding the same thereto in the presence of heat or a suitable gaseous medium which is responsible for releasing the clay from the surface of the die. Whilst the mold is in co-operation with the die, the transfer 18 has returned to the position shown in Fig. 1 and when the mold is lowered it is suspended in the central seat 22 of the transfer and upon reversal thereof to the jigger 8. During the next cycle a chuck 24 lifts the mold out of the seat 22 into co-operation with the profile 23 for the purpose of forming the back and foot in the case of flatware or the interior in the case of hollow ware, the mold being rotated incident to this operation. When the profiling operation is terminated, the mold is lowered onto the right end seat 25 of the transfer 18 and is then carried to the right, Fig. 1, over mold conveyor 2 (Fig. 6), where it is lifted from the seat by two opposed lifters 26 (one of which is shown) elevated by the jigger crosshead through rods 26a and while the transfer moves to the left, Fig. 1, the crosshead lowers the lifters 26 and deposits the mold on the transversely spaced plates 31 of the halted conveyor 2, preferably between spacers 2a (Fig. 6). The conveyor 2, Fig. 6, comprises a single endless strand of chain 27 running over central sprockets 28 and 28a located on shafts 29 and 29' at each end of the conveyor frame 30 respectively.

With regard to the feeder, 6a is a frame which supports an endless conveyor belt 6b on which the slug of clay 11 is deposited. The frame is supported by means of a bracket 6c attached to the lintel 6d of the fabricating machine, Fig. 8, and also by a bracket 6e under the front end thereof. When the rod 87 is pulled downwardly, the pivoted U shaped bracket 6f to which it is attached is swung to the left thereby swinging lever 6g to the left about its pivot 6h. To the lever 6g is attached a grapple (not shown) which is capable of gripping the lower run of belt 6b and moving it when the lever 6g is pivotally moved to the right, Fig. 8. This advances the slug of clay 11 to the left into the range of the cutting wire 12. When the lever 6g is pivotally swung to the left, the grapple loosens its grip on the belt and moves relative thereto. Thus, in step by step fashion, the slug is moved into the cutting off position.

The cutting wire 12 is suspended between a pair of spaced arms 12a, said arms being secured to the opposite sides of a U frame 12b which is pivotally mounted at 12c on a pair of pivoted levers 12d. The rear arm 12a, Fig. 8, has an extension 12e to which is connected an actuating rod 13, Fig. 10, which is caused to raise and lower with the crosshead 15.

The operation of the feeder is as follows: With the arms 12a in raised position, the slug of clay 11 is advanced to the left by the U shaped lever 6f which is swung to the right, the lead end of the slug advancing a desired distance beyond the cutting off point. Next, the rod 13 is elevated which causes the arms 12a to be depressed thereby passing the cutting wire 12 through the slug of clay and cutting off the charge. Thereupon, the U shaped lever 6f is swung to the left which causes lever 12d to pivot and move the cutting wire 12 forward in the direction of travel of the slug of clay 11, thereby clearing the forward end of the slug. The rod 13 is then depressed which elevates the cutting wire 12 whereupon the U shaped lever 6f is swung to the right which advances the slug of clay 11 while at the same time pulls back on the lever 12d and returns the cutting wire 12 to initial elevated position in readiness for the next succeeding cutting stroke.

Mounted in the center of the bracket 12b is a bar 12f which projects in front of the bracket and has a down turned forward end to which is attached a tool for producing in the body of the slug 11 a sunken space 12h in the form of an indentation extending longitudinally of the slug of clay and preferably in the center of the slug diametrically but in the upper surface as shown in Fig. 8a. The tool 12g produces a sunken space in the slug of clay each time the cutting wire is depressed and the sunken spaces overlap, preferably so as to produce a continuous groove extending from the lead end of the slug of clay rearwardly to the back end of the tool 12g.

By producing a sunken space in the body of the slug of clay across the bisecting line determined upon, the tendency on the part of the charge of clay to become rewelded to the parent body incident to segregation is avoided. The sunken space prevents the lips of the original indentation or incision produced by the cutting wire from coming together adhesively, thereby avoiding the creation of a vacuum chamber in rear of the cutting wire which may collapse the walls of the incision as the cut is made. Resealing of the incision in this fashion interferes with the pull of gravity and may either prevent the slice from separating altogether or may delay separation until the mold has started to lower, in which case the charge may not be dropped in appropriate position thereon. If the charge does not occupy the proper position, the mold is apt to become cocked under the press die due to improper distribution or concentration of plastic material.

Where the lips of the initial indentation or incision come together behind the cutting wire thereby forming a chamber, the sunken space is responsible for dividing the chamber into two sections of small capacity with intakes at the point where the cutting wire emerges from the clay at the periphery of the slug and in the sunken space, said intakes being of ample size to equalize the air pressure inside the chamber to that outside thereof. This avoids the creation of a vacuum and as the wire progresses inwardly, the pull of gravity almost immediately will break the marginal seal and the slice will progressively and cleanly separate from the parent mass.

To the shaft 32, Fig. 10, are secured the various cams which control the movement of the various elements of the machine as is described in detail in my British patent mentioned above, the machine being powered by a motor 32a independently of the power and driving provisions for the dryer conveyor 151 and the transfer C.

To intermittently drive the conveyors 1 and 2, Fig. 10, an intermittent gear 33 is secured to shaft 32 and drives a pinion 34 on hollow shaft 35 in housing 36. Mounted on the end of shaft 35 is a pin clutch which comprises a member 38 slidably mounted on and angularly secured to shaft 35 by a cross pin 39 located in longitudinal slots 40 which is oscillated by thrust rod 41 connected to pin 39 by cam 42 through roller lever 43 against tension of return spring 44 to move pins 45 of member 38 intermittently into and out of engagement with the U slot 46 formed in each of plates 47.

Plates 47 are pivotally connected to disc 48 secured to drive sprocket 49 on shaft 37 and have springs 50, attached to anchor plates 46' rigidly fastened to disc 48, connected to their upper ends, the pull being against the direction of rotation of shaft 37. Thus when pins 45, which are rotating with shaft 35, enter the U slots 46 the load is partly taken up by springs 50 in overcoming the inertia of shaft 37, thus reducing starting shock on the conveyors driven by sprocket 56 and preventing displacement of the molds carried by said conveyors.

Conveyor 1 progresses molds from the dryer to the transfer 9 and is arranged in three sections with the provisions for varying the speed or travel of any one section relative to the other. Section 54—54, Fig. 1, which feeds molds into transfer 9 is driven by sprocket 49, chain 51, sprocket 52, shaft 53 and grooved pulley 53a, Fig. 10, through a pin clutch 77—79, Fig. 11, operable by lever 72. When a mold enters seat 67 it engages and trips lever 72, as hereinafter explained, disengaging the pin clutch and disconnecting this section of the conveyor from the drive. For each revolution of cam 42, this section normally progresses a distance equal to the full upper run thereof unless interrupted by the throwing out of the pin clutch. This is to insure that a mold seated at any point along the upper run of this section, at the commencement of each intermittent drive, will be progressed into the transfer seat. In instances where a mold progresses only part way into the seat 67 by the time cam 42 disconnects the drive and stops the entire conveyor, the transfer will remain stationary due to latch 83, later described, which will remain locked until the mold is fully seated.

Section 57—57 of the conveyor is located for the major portion of its length in the dryer in a position traverse of a vertical course of the mold conveyor but paralleling the shelves 4, see Figs. 1 and 3. This section is driven by shaft 35 through sprocket 56, chain 58, Fig. 10, sprocket 59, Fig. 1, shaft 29, sprocket 61, chain 62, sprocket 65, shaft 66, sprocket 66a, chain 66b, pulley 64e, sprocket 66c and pulley 66d. The upper run of this section is progressed to the left in a series of intermittent advances. When a group of molds is transferred thereto from shelf 4, these molds must have progressed leftwise by the time the transfer C deposits the next group of molds thereon a distance sufficient for the right hand end mold of the first group to have cleared the left hand end of the transfer bars 90—91. Therefore the progress or travel of this section of the conveyor depends on such factors as the number of molds in a group, the spacing therebetween, the lineal feet occupied by the entire group on the upper run, which may vary with molds of different diameter. Thus this progress or travel of this section may be different than that of section 54—54, and it may vary for different sets of molds. Section 55—55 of the conveyor progresses the molds from section 57—57 to section 54—54 and is driven by chain 62 and drive sheaves 64a keyed on shaft 64 between idler sheaves 64b for the belts 64c of section 54—54 mounted on the same shaft. At the right hand of this section, the belts pass around idler sheaves 64d between similar idler sheaves all mounted on the same shaft for the belts of conveyor section 57—57. The distance travelled by the upper run of this conveyor, per machine cycle, may be exactly the same as that of section 57—57, thereby substantially preserving the spacing between molds for the length of these two sections, or the molds may be closed up by operating it at a slower speed than section 57—57 or increased by operating it at a higher speed. Variation in the linear progress or speed of travel of any one of these conveyor sections can be obtained by changing the ratio of the power transmission sprockets.

Conveyor 2, which is driven by shaft 29 and sprocket 28, progresses filled molds from the pottery machine to the dryer, Fig. 1, the upper run moving directionally to the right into the dryer bay in parallelism with the dryer shelves of a vertical course of the dryer conveyor. The linear travel of the upper run of this conveyor, per machine cycle, will be equal to the diameter of a mold plus the spacing requirement. In case it is desired to increase or decrease the amount of travel, the ratio of the power transmission sprocket 28 may be changed.

It is understood that while this pottery making machine is capable of forming and drying different sizes of ware and operating at different speeds, production changes are not, as a rule, made frequently. It is preferred that the machine be operated on a single shape for a substantial period, because a change in set-up will require the replacement of all of the molds and may require readjustment of the pottery machine and conveyors and other operating parts.

Transfer 9, Fig. 10, is provided with an interchangeable mold seat 67 attached to the head 69 by hooks 70 and pins 68, having a ledge 71 on which the molds rest on the underside of their brims. As each mold progresses into the seat, it engages a lever 72 which is pivoted to a bracket 73 mounted on the conveyor frame. As the mold contacts and swings the lever forward against the tension of spring 74 an eccentric 75, Fig. 11, adjustably secured to lever 72 by screw 72a and projecting into groove 76 is rotated, thereby moving clutch collar 76a to disengage pins 77 from teeth 78 of a notched driving disc 79 secured to sprocket 52. This disconnects pin plate 80 pinned to shaft 53 from the drive and the conveyor 1 is stopped. As the lever 72 is moved forward by the mold it engages a bar 81 which is pivoted at 82 to cause latch 83 to release the transfer 9. A screw 84 is provided for adjusting the latch relative to the bar 81, the hook portion thereof engaging with a pin 85 attached to the transfer head. Lever 72 and hook 83 are connected together by spring 86 so that as the mold transfer and mold moves to the position shown in Fig. 8 and the end of the conveyor is cleared, lever 72 is returned by spring 74 to the position shown in Fig. 10 which likewise pulls the hook 83 forward into position where it will latch the transfer when the same returns. Also, the pin clutch is again engaged and the conveyor drive reconnected in readiness for operation, which occurs when cam 42 again actuates the pin clutch on shaft 35. This occurs after the empty transfer 1 has returned to position at the lead end of conveyor 9. Through these provisions the transfer is held against operation in case the mold does not properly seat which safeguards the machine against damage. Also, the feeder is therefore not actuated to advance the slug 11, Fig. 8, because the drive connection 87 is connected to one of the parallel bars 27a. This provision eliminates waste of clay in case there is no mold at the feeding position.

Referring to Figs. 1 to 4 inclusive the mold transferring apparatus C is shown as comprising two sets of spaced elongated parallel mold gripping jaws 88 and 89 respectively and 90 and 91 respectively. The opposing faces of each set of jaws are faced with a resilient material 92 such as rubber or the equivalent to thereby prevent damage to the brims of the molds and also to permit the picking up of molds in a set which may have fractional differences in dimensions. These jaws are supported for vertical and transverse shifting relative to conveyors 1 and 2, and are supported by a longitudinally shiftable and vertically elevatable frame 93 having parallel bars 94 and 95, Fig. 4, connected across the rear by a brace rod, Fig. 2. The mold gripping jaws are supported adjacent each end from the bars 94 and 95 respectively by opposed channels 96 and 97, Fig. 4, channel 96 being secured to jaws 88 and 90 and channel 97 to jaws 89 and 91, the outside jaws 88 and 91 being connected by springs 98. The channels 95 and 96 are supported from the bars 94 and 95 on rollers 99, Figs. 2 and 4.

The jaws are opened by a lever arrangement, Fig. 3, which comprises a link 100 secured to jaw 91, Fig. 4, and link 101 secured to the opposing jaw 90, the ends of these links being pivoted to the opposite ends of the centrally pivoted bar 102 which is oscillated by link 103, Fig. 3, bell crank 104, link 105, pivoted lever 106 and cam 107.

The mechanism for elevating the gripping jaws, Figs. 2 and 3, comprises a closed frame 110 supported from horizontal and vertical frame components 112h and 114 respectively by a suspension arrangement which includes a pair of elongated pins 112a and 112b, Fig. 1. Pin 112a is journaled in brackets 112f suspended from the horizontal dryer components 112h and has an elongated sleeve 110a mounted thereon with spaced bellcranks 112 and 113, the bellcranks being pivotally attached to the frame 110 by pins 112g. Pin 112b is journaled in bearings 112c mounted on the frame component 114 and has a sleeve 112da corresponding to sleeve 110a with bellcranks that are pivotally attached to the frame 110 as shown. The bellcranks 112 are connected together to operate in unison by rod 126 and the frame is elevated, Fig. 3, by pivotally connecting an elevating rod 121 to rear bellcrank 112, the elevating rod being attached to lever 122 for reciprocation by cam 123.

For shifting the mold grippers horizontally between conveyors 1 and 2 and the dryer shelf 4, carriage 93, Fig. 2, is suspended from the frame 110 by members 126 provided with rollers 127. The frame is prevented from tilting by tandem rollers 128 which ride the underside of the frame 110. The entire frame 93 and gripping mechanism is shifted lengthwise of frame 110 by cam 130 through lever 129 pivotally connected to cross shaft 129a by link 129b.

Cams 107, 123 and 130 are mounted on shaft 132 rotated by an intermittent gear 133 on shaft 134 and intermittent gear 135 on shaft 132. To start rotation of shaft 132 only when conveyor 2 is filled with molds, thus transferring always a full shelf of molds to the dryer shelf, I have provided a shaft 134 driven by motor 136 through a clutching arrangement having a remote control actuated by the lead mold H, Fig. 2, of each group of filled molds.

In Fig. 5, a continually rotating sheave 137 driven by belt 138 is intermittently clutched to shaft 137a by expanding the clutch shoes 138a. Cam 139 has an operating lever 140 on the outside of the radial flange which is biased toward shoe expanding position at all times by spring 141, thus driving the shaft 134 by pinion 138c on shaft 137a and gear 138b on shaft 134.

To control the instant of clutch application and degree of shaft 134 rotation, I have provided a disc 139a on shaft 134 having a peripheral notch 140b into which roller 141a of a lever 142 on completion of one full rotation will drop. When this occurs, the ledge 143 on lever 142 engages the cam lever 140, thus disengaging the clutch and stopping rotation of shaft 134. The clutch will remain inoperative until the lead mold H, Fig. 2, trips the switch 144 to cause the solenoid 148 to retract the lever 142 whereupon the cam lever 140 is released and the spring 141 actuates the clutch to again connect shaft 134 to the source of power. In making a complete revolution, shaft 134 causes cam shaft 132 to rotate and the transfer apparatus to perform the operations of picking up and transferring molds as will be hereinafter described.

The dryer which is preferably utilized with this installation comprises a frame covered with insulating material and having the proper air conditioning apparatus such as fans, blowers, etc. and heating coils which have not been shown. Arranged throughout the dryer in upper and lower flights are pairs of chain sprockets 149 supported from dryer braces by hangers 150, the conveyor chain 151 being arranged in vertical looped courses as is customary. At the bay D, Fig. 3, end of the dryer, the chain is arranged in a downward course 152 and at or about the zone S, the dried ware is stripped from the molds by hand preparatory to the arrival of the molds at the takeoff position as represented by shelf 4 in Fig. 3 in ascending chain course 153. The conveyor is driven by shaft 134 through intermittent gears 164 and 165, the latter gear being mounted on shaft 166 having an adjustable coupling 167 therein and a sprocket 168 which drives a chain 169 connected to upper sprocket shaft 170 for driving the chain conveyor. The coupling 167 is provided in order to adjust the position of the shelves at G and 4 when assembling. The dryer shelves 172 are located in equal spaced intervals and are pivotally suspended by hooks 171 from dryer chains 151.

The present equipment is capable of jiggering and drying substantially all of the round jiggered shapes heretofore made on hand jiggers. It is preferred that only one shape be made at a time and therefore it will be assumed that the production in Fig. 1 is bowls. These molds are shown arranged in groups of five, one group to a dryer shelf and located in predetermined spaced relation. The number of molds in a set depends on the size of ware being made. For smaller size hollow ware, for instance cups, the number of molds per shelf may be increased to seven as shown in Fig. 2, however, the number of molds which may comprise a shelf group depends on the lineal measurement of the shelf, the outside circumference of the molds, and the limit of travel of conveyors 1 and 2 in relation to the speed of operation of the jiggering machine, all of which are factors in determining the spacing requirements for any particular group or style of molds. Thus, for cups, the speed of operation of the jiggering machine may be increased over that required for bowls with a corresponding increase in hourly production, however, this may not increase the drying cycle time or the speed of operation of the dryer conveyor.

Referring to Fig. 1, the transfer apparatus C is shown commencing to move forward in the direction of the arrows from full retracted position to which it is withdrawn following the transfer of molds between the dryer conveyor and the jigger machine conveyors 1 and 2. It will be observed that the relative position of the lead filled mold H in conveyor 2, and the right hand endmost mold K on the empty mold conveyor 1 indicates that in two more jigger machine cycles, (each jigger machine cycle the conveyors 1 and 2, and hence the molds thereon advance one division, equal approximately to the center to center spacing of the molds on shelf 4) the lead mold H on conveyor will have progressed to the far right hand end of the conveyor, this conveyor therefor being completely filled with molds containing ware, and empty mold K will have progressed two divisions to the left, thus locating it opposite the left hand end mold in the sheld 4 of the dryer. Coincident with the first of these two cycles, the transfer C moves forward as aforesaid in elevated position until the mold grippers 88—89 are directly over the filled mold conveyor 2, and the gripping jaws 90—91 are in registry with the dryer shelf 4, and then the frame 110 is lowered to bring the grippers into the position shown in Fig. 3 with the jaws open so as not to engage the molds. When the transfer reaches this position, the roller 141a, Fig. 5, drops into notch 140b, thus tripping lever 140 and disconnecting the drive to transfer C. Upon the second of these two jigger machine cycles, the lead mold H progresses to the right and engages a horizontal lever 144y, Fig. 1, thereby tilting plate 144' carrying mercury switch 144 into the position shown in full line Fig. 2. This causes mercury switch 144 to close, and energizes a circuit through line 144b and mercury switch 144c, (it will be assumed that switch 144c is closed) to solenoid 148, thereby energizing the armature and causing the retraction of lever 142, Fig. 5, thus starting the transfer drive whereupon cam 107 causes the gripper jaws to close and grip the halted filled molds on conveyor 2 and the empty molds on shelf 4, Fig. 3. Cam 123 elevates frame 110 sufficiently for the molds to clear the conveyor and shelf and cam 130 quickly retracts the grippers with molds to a position to the right of that shown in Fig. 3 with the empty molds previously occupying the shelf 4 now located directly over the input mold conveyor 1 and the filled molds centered over shelf 4. Between the time the transfer C picks up the molds on conveyor 2 and shelf 4 and shifts to this position, the jigger machine has completed one more cycle, thus moving the right hand end mold K out of registry with the left hand end of gripper bars 90—91. Cam 123 now causes the frame 110 to lower and cam 107 opens the mold grippers, thus depositing the filled and empty molds on the shelf and conveyor respectively whereupon the transfer is elevated and moved to the right to full retracted position substantially as shown in Fig. 1 where it dwells to clear vertically moved shelf 4 until interrupted gears 133 and 135 again co-act, Fig. 3.

The timing of this operation is such that the normal spacing between molds is maintained between the right hand end mold K of the previous group of empty molds on conveyor 1 and the lead or left hand mold of the newly deposited group of empty molds.

Coincident with the retraction of the transfer apparatus to and out-of-the-way position, intermittent gears 164 and 165 co-operate thereby rotating shaft 166 and thus advancing the dryer conveyor by one division to bring the next succeeding shelf of empty molds to the position previously occupied by shelf 4 in Fig. 3. Coincident with the disengagement of gears 164 and 165, gear 133 again co-operates with gear 135 and with the starting of cam shaft 132 the gripping members are elevated, shifted to the left, Fig. 3, and lowered to the position shown with gripping jaws opened to complete the cycle. When the end mold K, has moved two divisions to the left from the position shown in Fig. 1 it is directly opposite the left hand end mold of the group of molds on shelf 4. From this position, upon the next advance of conveyor 1, the mold K will be carried to a position now occupied by the mold G, thereby clearing the left hand end of transfer bars 90—91. If, for some reason, the end mold K should not progress to a position opposite the left end mold on shelf 4, or in other words should not progress to a position where, upon the aforesaid next advance of conveyor 1, mold K would normally be conveyed clear of the transfer bars, then in order to prevent damage to the mechanism which would result from lowering the transfer bars 90—91, I have provided means for interrupting the jigger machine drive and breaking the circuit 144b to the solenoid control 148 in the transfer actuating mechanism, thus bringing the entire machine to rest until the trouble is corrected.

In this regard, a thin elongated shoe 144n, see Figs. 3 and 13, is mounted on the frame of conveyor 1 for tilting movement relative to the upper run of the conveyor belts in section 57—57, so that the molds as they are progressed along the conveyor will partly ride the shoe and thus hold it in depressed position. The plate is mounted on an arm 144n2 pivotally mounted on a bracket 144n1 attached to the conveyor frame. Attached to the arm 144n2 is a switch plate 144e on which is mounted two mercury switches 144c and 144d, Fig. 7. In the position shown in Fig. 3, switch 144d is normally closed and switch 144c is open, thus a circuit to a solenoid 144g controlling the jigger clutch lever is established and the circuit to the transfer control solenoid 148 is broken.

The left end of the shoe, Fig. 13, is located at a point approximately on a line X—X (see Figs. 1 and 13) midway between the first and second molds on the left on shelf 4. The object is to hold the shoe in depressed position, until the right end mold K passes this line. The normal leftwise progression of the conveyor for one full rotation of cam 42 will be equal at least to the distance from line X—X to a point where the largest diameter mold will clear the left end of transfer bars 90—91, thus if the mold K, should first pass over this point, thereby releasing the shoe, the mold will be carried upon the next advance of conveyor 2 beyond the end of transfer bars 90—91, for instance to the position occupied by mold G, Fig. 1. Should the mold K fail to clear the left end of shoe 144n as it is progressing into a position opposite the left end mold on shelf 4, switch 144d will remain closed and switch 144c open, thus with the closing of switch 144, a circuit will be energized through 144b, switch 144d, 144f to solenoid 144g, thereby interrupting the operation of the jigger. Solenoid armature 144g is pivotally connected to a latch 144j pivoted at 144k to the jigger machine frame. This latch holds clutch lever 144l of the jigger machine in working position as long as the aforesaid circuit is de-energized, however, upon energization the latch is tripped and a spring 144g1, which may be attached to any convenient part of the machine frame, causes lever 144l to move to clutch engaging position. The pivoted handle 144m provides means for manually operating the clutch lever 144l.

Switch 144c, being open, interrupts circuit 144b so that solenoid 148 is not energized and the transfer actuating mechanism is not engaged. Therefore, the transfer, which is in the position shown in Fig. 1, remains stationary until the mold is removed from the shoe 144n. Thereupon shoe 144n tilts upwardly due to the fact that plate 144n2 overbalances the weight of the shoe, and this causes switch 144c to close and switch 144d to open, thereby interrupting the circuit to solenoid 144g (whereupon the operator manually throws in the jigger machine clutch) whilst the circuit to the solenoid 148 is again energized whereupon the drive to transfer C is reconnected and the cycle of operations thereof restarted. When the group of molds transferred from shelf 4 are set on conveyor 2, shoe 144n is depressed under the weight of one or more of the molds to horizontal position shown in Fig. 3. The pivoted plate 144' on which switch lever 144y is mounted is spring returned to the full line position shown in Fig. 2 upon the lifting of the row of filled molds by the transfer thus de-energizing the circuit.

In order to accommodate sets of molds of a different size or class for making ware of other classification, such as plates, saucers, as distinguished from cups or bowls, I prefer to replace the bars 88, 89, 90 and 91 with bars of greater or lesser thickness or by using a rubber facing of greater or lesser thickness or both. The bars are preferably mounted on their respective support members by a means which will permit their detachment and also adjustment relative to one another.

With the apparatus herein described, the production of dried jiggered ware can be placed on more of a systemized basis and the rate of production appreciably increased because of the elimination of stops for which the manual mold carrier is, in hand practice, largely responsible.

It will be understood that the mold transferring apparatus herein disclosed could be used with empty and filled mold conveyors having driving provisions independent of the jiggering machine and with other types of dryers. It is also understood that the transferring apparatus could be used for point to point transference of molds other than the points herein disclosed and that obvious modifications and adaptions could be made without departing from the spirit and scope of this invention.

Having thus described my invention, what I claim is:

1. In apparatus of the class specified, the combination of a pottery fabricating machine having conveyors for empty molds and filled molds respectively, driving means for said fabricating machine and conveyors, a dryer having a chain conveyor with mold carrying trays, elongated gripping members operable to transport rows of empty and filled molds between the dryer conveyor and the fabricating machine conveyors, means for causing the gripping members to exert a pressure on the pottery molds and means operating in synchronism with said driving means for moving said gripping members.

2. In apparatus of the class specified, the combination of a pottery fabricating machine having conveyors for empty and filled molds respectively, means for driving said fabricating machine and conveyors, a dryer having a chain conveyor with mold carrying trays, elongated gripping members operable to transport rows of empty and filled molds between the trays and the fabricating machine conveyors, means for causing the gripping members to exert pressure on the pottery molds in order to retain the same whilst being transported and control mechanism operable in response to the accumulation of a predetermined number of molds on at least one of said fabricating machine conveyors for intermittently starting the operation of said gripping mechanism.

3. In apparatus of the class specified, the combination of a fabricating machine and mold conveyor, a dryer conveyor with mold carrying trays, drive mechanism for said fabricating machine and mold conveyors, a mold transferring apparatus including elongated gripping members capable of exerting pressure on the mold in order to retain the same whilst being transported, means for driving said mold transferring apparatus and said dryer conveyor and mechanism for intermittently starting the operation of said driving means when a predetermined number of filled molds have been accumulated on one of said fabricating machine conveyors.

4. In apparatus of the class specified, a dryer conveyor having mold carrying trays, clay forming mechanism with mold conveying mechanism, a mold transfer including gripping members operable to transport rows of empty and filled molds between the aforesaid mold conveying means, means for causing gripping members to exert lateral pressure on the molds in order to retain the same whilst being transported, drive means for said forming mechanism, drive mechanism for said transfer and conveyor, means for interrupting the transfer and conveyor drive when the molds reach a predetermined position on said forming machine conveying mechanism relative to said transfer or for interrupting the operation of the forming machine drive means or both.

5. In apparatus of the class specified, a dryer conveyor having mold carrying trays associated therewith, a jigger machine provided with mold conveying mechanism, a mold transferring apparatus including elongated gripping members shiftable between the trays and the conveying mechanism, means for causing the gripping members to exert lateral pressure on the molds, drive means for the jigger including a clutch, drive mechanism for the dryer conveyor and transfer including a clutch and means for rendering both of said clutches inoperative in response to a predetermined positioning of molds on the jigger machine conveying mechanism relative to the transfer apparatus.

6. In apparatus of the class specified, a dryer conveyor having mold carrying trays, clay feeding and forming mechanism and conveying mechanism for empty molds, intermittently moving mold transferring mechanism, said mold transferring mechanism including elongated gripping members adapted to pick up and transfer a variable number of molds simultaneously together with means for causing said gripping members to exert pressure on the molds, means for automatically actuating said mold transferring mechanism when the empty molds on said conveying mechanism reach a predetermined position relative to said transfer apparatus.

7. In apparatus of the class specified, feeding and forming mechanism, a dryer having a mold conveyor with mold carrying trays, mold conveying mechanism associated with said feeding and forming mechanism, mold transferring means operating between said trays and said conveying mechanism adapted to transfer simultaneously a plurality of molds arranged in alignment, said mold transferring means including elongated gripping members operable to pick up and transport molds, means for causing said gripping members to exert lateral pressure on said molds, mechanism for transferring molds between said conveying mechanism and said forming mechanism and means for bringing each successive mold on said conveying mechanism to a predetermined constant position of rest relative to said mold transferring means and said mold transferring mechanism regardless of irregular spacing thereof on the trays of the dryer mold conveyor.

8. In apparatus of the class specified, feeding and forming mechanism, individual conveyors for empty molds and for filled molds associated therewith, a dryer conveyor with spaced mold carrying trays, a mold transfer apparatus for removing a tray full of molds from the dryer at a time and depositing the same on the empty mold conveyor, said mold transfer apparatus including elongated gripping members, means for causing the gripping members to exert lateral pressure on the molds, means for bringing each successive mold on the empty mold conveyor to a predetermined position of rest relative to the feeding mechanism regardless of irregular spacing thereof prior to deposit thereon and means for interrupting the operation of the forming and feeding mechanism, said conveyors and said transfer apparatus in case the spacing error exceeds a predetermined amount.

9. In a pottery machine, mechanism for feeding plastic clay to molds, and an intermittently movable mold conveyor, intermittently operating mold transferring means operating between said conveyor and said feeding mechanism, means for latching said transfer adjacent said conveyor, drive means for said conveyor, means for releasing the drive means from said conveyor when each successive mold reaches the transfer position and disconnecting the transfer from the latching means.

10. In a pottery machine, feeding mechanism, mold conveying mechanism and drive means therefor and mold transferring mechanism for transporting molds therebetween drive mechanism for said feeding and transferring mechanism and means for rendering said feeding and transferring mechanism inoperative except when a mold on said conveyor is occupying a predetermined position relative to said transferring mechanism and means for disconnecting said conveyor from said drive means when said mold is shifted into said transfer apparatus.

11. In apparatus of the class specified, clay forming mechanism, a dryer having a mold conveyor with trays, a mold transfer apparatus disposed in a bay of the dryer in operative adjacency to the trays of the mold conveyor, a conveyor for empty molds and a conveyor for filled molds running between the dryer and forming mechanism, mold grippers associated with said transfer apparatus juxta-posed relative to said empty and filled mold conveyors and movable horizontally and vertically relative thereto and to the trays of said dryer conveyor whereby a shelf full of filled molds and a shelf full of empty molds is transferred simultaneously between said filled mold conveyor and a shelf of said dryer and between a shelf of the dryer and the empty mold conveyor respectively, means for actuating said transfer apparatus alternately with the operation of the dryer conveyor and means for intermittently actuating said empty and filled mold conveyors to simultaneously move empty molds out of the range of operations of the transfer and to advance filled molds into the range of operation of the transfer.

12. In apparatus of the class specified, a jiggering machine having feeding, pressing and jiggering mechanism together with a shiftable multiple seat mold transfer and a single seat mold transfer and a pair of conveyors, one for filled molds and the other for empty molds, both being operated synchronously but the empty mold conveyor being capable of operation at different speeds in different sections, a latch for holding the single seat transfer adjacent the empty mold conveyor in mold receiving position in case a mold is not deposited therein, the inoperativeness of the transfer preventing the operation of the feeder except when a mold is transferred thereto, a drive mechanism for the conveyors which is provided with means for intermittently starting and stopping the same in synchronism with the other operations of the forming machine having a clutch mechanism for additionally disconnecting the drive, the clutch being operated by the molds moving into the transfer on the empty mold conveyor, and a dryer comprising air conditioning and circulating means and a chain conveyor with spaced mold shelves on which the molds are arranged in rows and are caused to travel through the dryer in ascending and descending courses past a stripping and a mold transferring station where a mold transferring apparatus is located which is adapted to remove molds, a shelf full at a time from the trap of the dryer conveyor and align and deposit the same in spaced aligned relation on the empty mold conveyor and to remove filled molds from the filled mold conveyor and place the same on the vacated dryer shelf, the transfer comprising two sets of resiliently faced elongated bars mounted for relative movement by a cam actuated mechanism on a vertically elevatable and horizontally shiftable framework which is operated by cam and lever components, each set of mold gripping bars being capable of picking the molds up frictionally by their brims regardless of variations in dimensions of the molds and being self or automatically adjustable to accommodate molds differing in size, and drive mechanism for the transfer apparatus which includes a plurality of interrupted gears and a clutch mechanism with a solenoid controlled operating means which is connected in a circuit capable of being energized by the lead mold in each set to be transferred that is conveyed on the filled mold conveyor to the transfer position, the clutch controlling the starting of the transfer and the dryer conveyor but the transfer and dryer having means for operating the same alternately, and a clutch control for the jiggering machine motor which is also electrically operated and a safety provision by the molds on the empty mold conveyor in case the molds have not moved out of the range of the transfer apparatus by the time the transfer is again in readiness to shift, the effect being to shunt the circuit from the transfer clutch circuit to the pottery machine circuit and thus disconnect the pottery machine clutch and prevent the engagement of the transfer clutch, said apparatus further having provisions for depositing the molds in evenly spaced relation between spacers on the filled mold conveyor and due to the variable speed driving connections for different sections of the empty mold conveyor, any mold spacing errors, within predetermined limits, can be corrected without disturbing the periodic operation of the jiggering machine primarily by giving the conveyor section adjacent the single seat transfer sufficient over-travel per machine cycle to insure the seating of a mold which is deposited thereon at the commencement of the travel of the said conveyor section each machine cycle.

13. In the manufacture of potteryware from plastic clay on absorbent molds with an automatic pottery machine and a chain dryer having a conveyor provided with spaced mold carrying shelves, the method of automatically supplying the jiggering machine with molds taken from the dryer and restoring molds thereto which comprises arranging a line of molds extending from the dryer to the fabricating machine for empty molds and a line extending from the fabricating machine to the dryer for filled molds, the terminals of the lines being arranged in parallelism with the conveyor trays and straddling the path of travel of the dryer conveyor, removing filled molds from the line in a number required to fill a dryer shelf whilst simultaneously removing a number of molds from the dryer shelf equal to the number of filled molds and placing the empty molds in the empty mold line, the operations being performed successively with respect to each tray and periodically with respect to the jiggering machine fabricating cycle.

14. In combination with a pottery fabricating machine and a pottery drying conveyor, a mold transfer including elongated members for gripping rows of empty and filled molds, means for causing said elongated members to exert lateral pressure on the molds, mechanism for transporting the said molds between the fabricating machine and drying conveyor and means for rendering the transfer inoperative if the zone of empty mold deposit is occupied.

15. In combination with a pottery fabricating machine and a pottery drying conveyor, a mold transfer including elongated members for gripping rows of empty and filled molds in unison by the brims thereof, means for causing said elongated members to exert lateral pressure on the molds, mechanism for shifting said gripping means to various positions relative to the drying conveyor to thereby transport the rows of molds between points of deposit and points of pickup adjacent the fabricating machine and the drying conveyor respectively together with means for driving the fabricating machine and the transfer in timed relation.

16. In combination with a pottery fabricating machine and a pottery drying conveyor, a transfer having means for gripping rows of empty and filled molds and transporting the same between points of pickup and deposit associated with the fabricating machine and the drying conveyor respectively said gripping means including elongated members and means for causing said members to exert lateral pressure on the molds and means for preventing the operation of said drying conveyor whilst the transfer is in operation.

WILLIAM J. MILLER.